L. MAYER.
KNUCKLE CONNECTION AND DRIVE FOR VEHICLE WHEELS.
APPLICATION FILED MAY 5, 1910.
1,027,137.
Patented May 21, 1912.
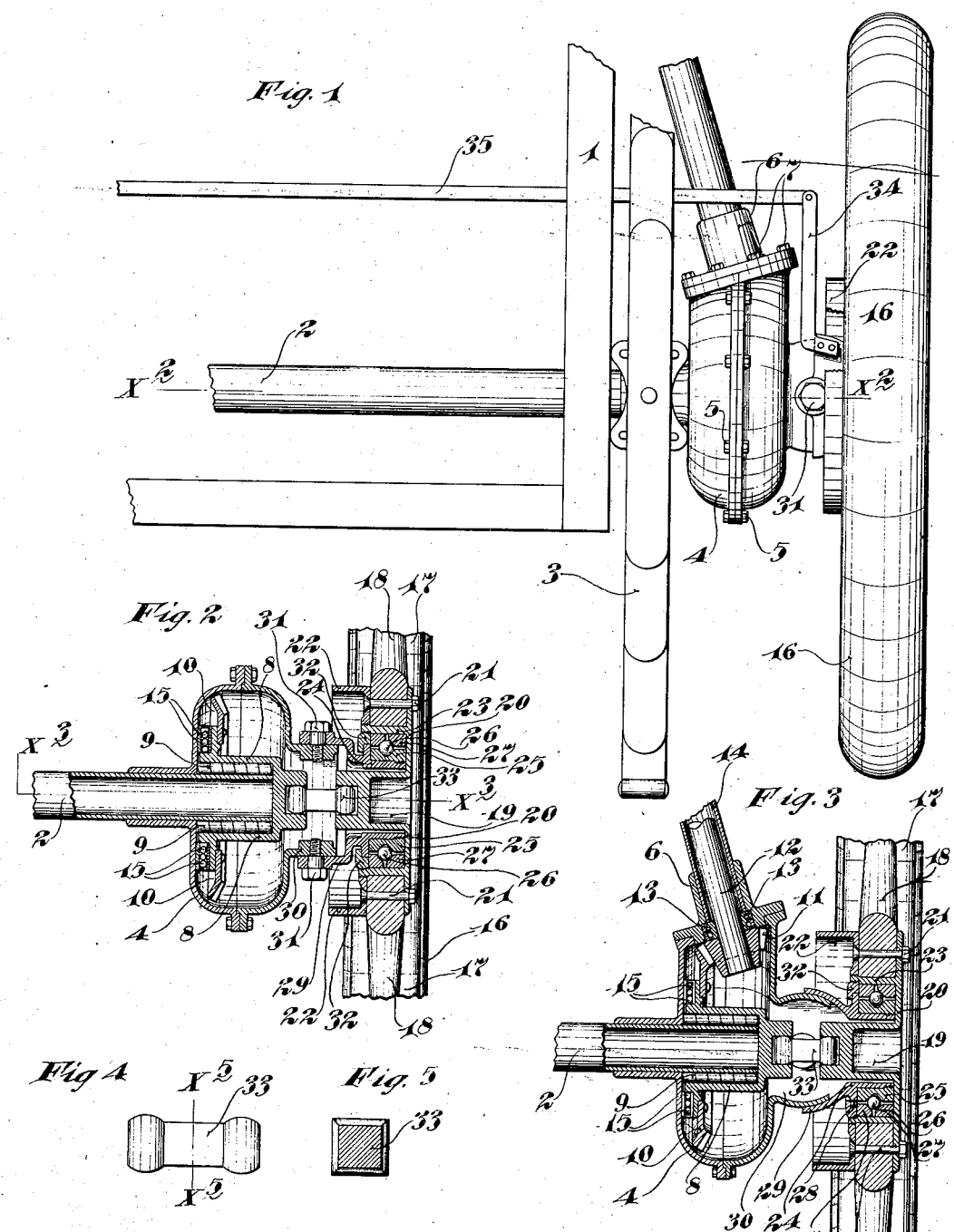

UNITED STATES PATENT OFFICE.

LOUIS MAYER, OF MANKATO, MINNESOTA.

KNUCKLE CONNECTION AND DRIVE FOR VEHICLE-WHEELS.

1,027,137.  Specification of Letters Patent.  Patented May 21, 1912.

Application filed May 5, 1910. Serial No. 559,544.

*To all whom it may concern:*

Be it known that I, LOUIS MAYER, a citizen of the United States, residing at Mankato, in the county of Blue Earth and State of Minnesota, have invented certain new and useful Improvements in Knuckle Connections and Drives for Vehicle-Wheels; and I do hereby declare the following to be a full, clear, and exact description of the invention, such as will enable others skilled in the art to which it appertains to make and use the same.

My present invention has for its object to provide an improved knuckle connection and drive for automobiles or motor propelled vehicles and, to this end, it consists of the novel devices and combinations of devices hereinafter described and defined in the claims.

In the accompanying drawings which illustrate the invention, like characters indicate like parts throughout the several views.

Referring to the drawings, Figure 1 is a fragmentary plan view, showing a portion of the running gear of an automobile and illustrating my invention as incorporated therein; Fig. 2 is a vertical section taken on the line $x^2$ $x^2$ of Fig. 1, some parts being broken away; Fig. 3 is a horizontal section taken on the line $x^3$ $x^3$ of Fig. 2, some parts being broken away; Fig. 4 is a detail of a so-called driving knuckle; and Fig. 5 is a section on the line $x^5$ $x^5$ of Fig. 4.

It may be here stated that, in the drawings, my present invention is shown as incorporated in a vehicle running gear of the type disclosed and claimed in my companion application filed of date May 5th, 1910 under Serial Number 559,543 and entitled "Vehicle running gear."

The numeral 1 indicates the rectangular frame of the running gear, to which the tubular axle 2 is rigidly secured. The said axle 2 may be assumed to be either the front or the rear axle of the vehicle.

The numeral 3 indicates an elliptical spring which, as shown, is secured to the sleeve-like hub of a divided gear case 4, the main sections of which are detachably but rigidly connected by small nutted bolts 5. Also, the gear case 4 is provided with a sleeve-like approximately radial bearing hub 6 detachably secured thereto by bolts 7. The end of the axle 2 projects into and nearly through the gear case 4 and journaled thereon is a sleeve-like driving hub 8, bearing rollers 9 being preferably applied in the said journal. The driving hub 8 carries or is secured to a bevel gear 10 that meshes with a bevel pinion 11 carried by the end of a driving shaft 12 that is journaled to the bearing hub 6, preferably, by a ball bearing 13. The shaft 12, as shown, is extended through a tubular casing 14 secured to the hub 6. The said shaft 12 is positively driven from the vehicle propelling motor in some suitable way as, for instance, by the mechanism disclosed and claimed in my said companion application filed of date May 5th, 1910 under Serial Number 559,543 and entitled "Vehicle running gear." As shown, the ball bearing device 15 is interposed between the inner wall of the gear case 4 and a flange of the driving hub 8, to take the end thrust of the said driving hub.

The wheel shown is of the type disclosed and claimed in my companion application entitled "Improved wheel and journal," and, as shown, it comprises a tire 16, rim 17, spokes 18 and a hub 19 having a disk-like flange 20, to which the spokes 18 are rigidly secured, as shown, by nut bolts 21. The said bolts 21 also secure a brake flange 22 to the wheel spokes and hub flange 20. The vertical web of the brake flange 22 serves as an annular spoke clamping plate and, at its inner edge, it has threaded engagement with a cylindrical flange 23 that projects inward from the hub flange 20.

The wheel is journaled on a tubular wheel trunnion 24, around which is secured, as shown, by threaded engagement, an externally grooved ball runway 25. Bearing balls 26 are interposed between the ball runway 25 and a circumferentially split ball runway 27 seated within the cylindrical hub flange 23. The trunnion 24 is provided, just outward of the ball runway 25, with an outwardly extended retaining flange 28, and outward of the said flange it is formed with a segmental cylindrical so-called knuckle box 29, the upper and lower extremities of which are flat. This segmental knuckle box 29 fits over and works pivotally on a correspondingly formed segmental knuckle box 30 cast integral with the outer section of the gear case 4. The two segmental knuckle boxes 29—30 are pivotally connected at 31, as shown, by axially alined vertical machine screws or bolts, which afford a pivotal connection between the gear case and the wheel trunnion, so that the wheel is mounted for steering movements on a pivot having a vertical axis.

The wheel is interlocked to the wheel trunnion with freedom for rotation, by a lock ring 32 which, as shown, is screwed into the projecting end of the hub flange 23 and overlaps the trunnion flange 28. As more fully disclosed in my companion application filed of date May 5th, 1910 under Serial Number 559,542 and entitled "Improved wheel and journal," the ring 32 is split or divided, so that it may be placed in working position over the knuckle box 29.

To transmit the driving force from the gear hub 8 to the wheel hub 19, the said members, at their opposing ends, are formed with square or angular seats that receive the square or angular heads of a driving knuckle 33, which is in the form of a short metal link. The squared ends of this driving knuckle are rounded longitudinally thereof, so as to permit the required oscillatory movements of the said knuckle when the wheel is moved on the pivot 31. This knuckle connection between the driving and driven members will transmit motion to the wheel under all positions of the wheel trunnion and affords a construction which may be very quickly put together or taken apart for repairs. The coöperating knuckle boxes 29—30, while capable of pivotal movements one on the other, nevertheless, afford a close housing for the driving knuckle and its connections and protect the same from dirt and dust. They also afford means for holding hard oil, if desired, and, in fact, afford a sort of an extension of the gear case. The relatively movable knuckle box 29, which is a part of the pivotally mounted wheel trunnion, is shown as provided with a projecting arm 34, to which a tie bar 35 of the steering mechanism is pivotally connected at one end.

What I claim is:

1. In a vehicle running gear, the combination with pivotally connected knuckle boxes, one of which is secured to a fixed part of the vehicle frame and the other of which is provided with a wheel trunnion, of a wheel journaled on said trunnion, a driving hub extending into the relatively fixed knuckle box, a wheel hub extending into the relatively movable knuckle box, and a driving link extending across the axis of said pivotal connection and connecting the said two hubs on opposite sides of said axis but permitting pivotal movement of the said trunnion, substantially as described.

2. In a vehicle running gear, the combination with pivotally connected knuckle boxes, one of which is secured to a fixed part of the vehicle frame and the other of which is provided with a wheel trunnion, of a wheel journaled on said trunnion, a driving hub extending into the relatively fixed knuckle box, a wheel hub extending into the relatively movable knuckle box, and a driving link extending across the axis of said pivotal connection and having angular heads detachably seated in the opposite ends of said driving hub and said wheel hub and serving to transmit motion from the former to the latter while permitting pivotal movement of said trunnion, substantially as described.

3. In a vehicle running gear, the combination with a fixed axle and a gear case secured thereto, the end of said axle projecting into said gear case, a beveled gear in said gear case journaled on the said end of said axle and provided with a driving hub, said gear case having at one side a segmental knuckle box, a driving shaft extending into said gear case and provided with a pinion meshing with said gear, a tubular wheel trunnion provided with a segmental knuckle box pivotally connected to the knuckle box of said gear case by vertically alined and spaced pivot joints, a wheel journaled on said wheel trunnion and provided with a hub extending into the same, and a driving knuckle located within the pivotally connected knuckle boxes and having angular ends seated in the opposing ends of the driving hub of said gear and of the hub of said wheel, substantially as described.

4. In a vehicle running gear, the combination with a fixed axle and a gear case secured thereto, the end of said axle projecting into said gear case, a gear in said gear case, having a hub telescoped over the projecting end of said axle, and anti-friction devices interposed between the projecting end of said axle and the hub of said gear, substantially as described.

In testimony whereof I affix my signature in presence of two witnesses.

LOUIS MAYER.

Witnesses:
ALICE V. SWANSON,
HARRY D. KILGORE.